United States Patent
Dion et al.

(10) Patent No.: US 10,280,951 B2
(45) Date of Patent: May 7, 2019

(54) ARTICULATING DEVICES

(71) Applicants: Genevieve Dion, Philadelphia, PA (US); Richard Primerano, Philadelphia, PA (US)

(72) Inventors: Genevieve Dion, Philadelphia, PA (US); Richard Primerano, Philadelphia, PA (US)

(73) Assignee: Drexel University, Philadelphia, PA (US)

( * ) Notice: Subject to any disclaimer, the term of this patent is extended or adjusted under 35 U.S.C. 154(b) by 210 days.

(21) Appl. No.: 15/123,031

(22) PCT Filed: Feb. 27, 2015

(86) PCT No.: PCT/US2015/018190
§ 371 (c)(1),
(2) Date: Sep. 1, 2016

(87) PCT Pub. No.: WO2015/134335
PCT Pub. Date: Sep. 11, 2015

(65) Prior Publication Data
US 2017/0067490 A1 Mar. 9, 2017

Related U.S. Application Data

(60) Provisional application No. 61/946,815, filed on Mar. 2, 2014.

(51) Int. Cl.
*F01B 19/04* (2006.01)
*F15B 15/10* (2006.01)
(Continued)

(52) U.S. Cl.
CPC .......... *F15B 15/10* (2013.01); *B25J 15/0023* (2013.01); *B29C 70/086* (2013.01); *B32B 1/08* (2013.01);
(Continued)

(58) Field of Classification Search
CPC .............................. B25J 15/0023; F01B 19/04
See application file for complete search history.

(56) References Cited

U.S. PATENT DOCUMENTS

| 200,965 A | 3/1878 | Baker |
|---|---|---|
| 2,642,091 A | 6/1953 | Morin |

(Continued)

FOREIGN PATENT DOCUMENTS

| JP | 05099206 A | 5/1993 |
|---|---|---|
| JP | 2007068794 A | 3/2007 |

(Continued)

OTHER PUBLICATIONS

International Search Report and Written Opinion, International Patent Application No. PCT/US2015/018190, dated Jun. 22, 2015.

(Continued)

*Primary Examiner* — F Daniel Lopez
(74) *Attorney, Agent, or Firm* — Saul Ewing Arnstein & Lehr LLP; Kathryn Doyle; Brian R. Landry

(57) ABSTRACT

One aspect of the invention provides an articulating device including: an inflatable elastic layer and a textile shell surrounding or impregnated within at least a portion of the inflatable elastic layer. The textile shell includes at least two regions having different material properties or knit patterns. The textile shell selectively constrains expansion of the inflatable elastic layer to produce controlled bending or torsion. Another aspect of the invention provides an articulating device including: an inflatable elastic layer and a textile shell surrounding or impregnated within at least a portion of the inflatable elastic layer. The textile shell has a curved profile and selectively constrains expansion of the inflatable elastic layer to produce controlled bending.

15 Claims, 6 Drawing Sheets

(51) Int. Cl.
  *B29C 70/08* (2006.01)
  *B25J 15/00* (2006.01)
  *B32B 1/08* (2006.01)
  *B32B 5/02* (2006.01)
  *B32B 25/10* (2006.01)
  *F16L 11/10* (2006.01)

(52) U.S. Cl.
  CPC .............. *B32B 5/026* (2013.01); *B32B 25/10* (2013.01); *B32B 2307/51* (2013.01); *F01B 19/04* (2013.01); *F15B 2215/305* (2013.01); *F16L 11/10* (2013.01)

(56) References Cited

U.S. PATENT DOCUMENTS

| | | |
|---|---|---|
| 3,035,779 A | 5/1962 | Convis |
| 3,288,169 A | 11/1966 | Moss |
| 3,567,562 A | 3/1971 | Gordon et al. |
| 3,638,536 A | 2/1972 | Kleinwachter et al. |
| 3,640,564 A | 2/1972 | Kuster |
| 3,645,173 A | 2/1972 | Yarlott |
| 3,826,288 A | 7/1974 | Cooper et al. |
| 3,924,519 A | 12/1975 | England |
| 4,308,896 A | 1/1982 | Davis |
| 4,721,030 A | 1/1988 | Paynter |
| 4,733,603 A | 3/1988 | Kukolj |
| 4,751,869 A | 6/1988 | Paynter |
| 4,826,206 A | 5/1989 | Immega |
| 4,841,845 A | 6/1989 | Beullens |
| 4,854,846 A | 8/1989 | Oglesby |
| 4,934,982 A | 7/1990 | Immega et al. |
| 5,014,515 A | 5/1991 | Krauter |
| 5,079,999 A | 1/1992 | Negishi et al. |
| 5,080,000 A | 1/1992 | Bubic |
| 5,083,498 A | 1/1992 | Sato et al. |
| 5,167,891 A | 12/1992 | Dijkman, Sr. et al. |
| 5,251,538 A | 10/1993 | Smith |
| 5,385,080 A | 1/1995 | Suzumori |
| 5,697,285 A | 12/1997 | Nappi et al. |
| 6,168,634 B1 | 1/2001 | Schmitz |
| 6,698,457 B2 | 3/2004 | Hayashi et al. |
| 7,862,580 B2 | 1/2011 | Cooper et al. |
| 7,914,487 B2 | 3/2011 | Davies, Jr. et al. |
| 8,025,942 B2 | 9/2011 | Defoort et al. |
| 8,291,941 B1 | 10/2012 | Berardi |
| 8,615,966 B2 | 12/2013 | Thompson |
| 8,640,386 B1 | 2/2014 | Griffith et al. |
| 2003/0089971 A1 | 5/2003 | Akers et al. |
| 2009/0030282 A1 | 1/2009 | Garcia et al. |
| 2009/0173223 A1 | 7/2009 | Kudawara et al. |
| 2010/0023047 A1 | 1/2010 | Simpson |
| 2012/0168012 A1 | 7/2012 | Statler, III et al. |
| 2013/0170158 A1 | 7/2013 | Van Abeelen et al. |
| 2013/0331784 A1 | 12/2013 | Pepper et al. |
| 2014/0109560 A1 | 4/2014 | Ilievski et al. |
| 2014/0208937 A1 | 7/2014 | Henry et al. |
| 2014/0318118 A1 | 10/2014 | Mazzeo et al. |
| 2015/0070904 A1 | 3/2015 | Martinez et al. |
| 2015/0283699 A1 | 10/2015 | Morin et al. |
| 2015/0337873 A1 | 11/2015 | Yang et al. |
| 2015/0375817 A1 | 12/2015 | Tolley et al. |
| 2016/0017899 A1 | 1/2016 | Yang et al. |

FOREIGN PATENT DOCUMENTS

| | | |
|---|---|---|
| JP | 4564788 B2 | 10/2010 |
| WO | WO 2009/027979 A2 | 3/2009 |
| WO | WO 2012/148472 A2 | 11/2012 |
| WO | WO 2013/103412 A2 | 7/2013 |
| WO | WO 2013/110086 A1 | 7/2013 |
| WO | WO 2013/130760 A2 | 9/2013 |
| WO | WO 2013/148340 A2 | 10/2013 |
| WO | WO 2014/015146 A2 | 1/2014 |

OTHER PUBLICATIONS

CNET, "Reinventing energy at ARPA-E (photos)", http://www.cnet.com/pictures/reinventing-energy-at-arpa-e-photos/2/, Downloaded Feb. 23, 2015.

Daerden, F., et al., "Pneumatic Artificial Muscles: actuators for robotics and automation", Vrije Universiteit Brussel, Department of Mechanical Engineering, Pleinlaan 2, B-1050 Brussels, Downloaded Feb. 22, 2014.

Faudzi, A. A. M., et al., "Development of Bending Soft Actuator with Different Braided Angles", The 2012 IEEE/ASME International Conference on Advanced Intelligent Mechatronics, Jul. 2012.

Guizzo, E., "iRobot Smashes Its New Robotic Hand With Baseball Bat", http://spectrum.ieee.org/automation/robotics/robotics-hardware/irobot-smashes-its-new-rob . . . , Nov. 2012.

Howe, R. D., "Harvard Biorobotics Lab", http://biorobotics.harvard.edu/i-hy.html, Feb. 2015.

Harvard Magazine, "Kick, In the Pants: Wearable Robots", Jan.-Feb. 2014.

Martinez, R. V., et al., "Elastomeric Origami: Programmable Paper-Elastomer Composites as Pneumatic Actuators", Advanced Functional Materials, 22, 1376-1384, 2012.

Moon, M., "DARPA is funding the development of a soft, fabric-based exoskeleton", http://www.engadget.com/2014/09/12/darpa-harvard-soft-exosuit/, Downloaded Feb. 23, 2015.

Otherlab, "The Ant-Roach", https://otherlab.com/blog/post/the-ant-roach, Downloaded Feb. 23, 2015.

Otherlab Orthotics, A fundamental jump in exoskeleton technology, http://www.orthotics.otherlab.com, Downloaded Feb. 23, 2015.

Panne, Robots to the rescue, Harvard Gazette, http://news.harvard.edu/gazette/story/2013/10/robots-to-the-rescue/,, Downloaded Feb. 23, 2015.

Sanan, S., "Soft Inflatable Robots for Safe Physical Human Interaction", Carnegie Mellon University, Submitted in partial fulfillment of the requirements fro the degree of Doctor of Philosophy in Robotics, Aug. 2013.

Santos, A., "Eyes-on: University of Pennsylvania's TitanArm exoskeleton (video)", http://www.engadget.com/2013/05/04/eyes-on-university-of-pennsylvanias-titanarm-exoskeleton/, May 4, 2013.

Wyss, H., "3D Fabrication of Textile Devices: From Rapid Porotyping to Mass Pro . . . ", http://wyss.harvard.edu/viewevent/340/3d-fabrication-of-textile-devices . . . , downloaded Jan. 2015.

ARTICULATING DEVICES

CROSS-REFERENCE TO RELATED APPLICATIONS

This application is a national phase application under 35 U.S.C 371 of International Application No. PCT/US2015/018190, filed Feb. 27, 2015, which claims priority to U.S. Provisional Patent Application Ser. No. 61/946,815, filed Mar. 2, 2014. The entire content of each application is hereby incorporated by reference herein.

BACKGROUND

Despite recent advances in both robotics technologies and applications therefor, robotic devices continue to utilize materials that are have undesirable weight, form factors, and the like.

SUMMARY OF THE INVENTION

One aspect of the invention provides an articulating device including: an inflatable elastic layer; and a textile shell surrounding or impregnated within at least a portion of the inflatable elastic layer. The textile shell includes at least two regions having different material properties or knit patterns. The textile shell selectively constrains expansion of the inflatable elastic layer to produce controlled bending or torsion.

This aspect of the invention can have a variety of embodiments. The inflatable elastic layer can be an elastomeric bladder. The elastomeric bladder can be received within the textile shell.

The inflatable elastic layer can be bonded to an inner surface of the textile shell.

The at least two regions can include a region of relatively lower elasticity and a region of relatively higher elasticity. The region of relatively higher elasticity can be positioned on an opposite side of the articulating device from the region of relatively lower elasticity. The region of higher elasticity can include a material having a lower Young's modulus than a material in the region of lower elasticity. The region of higher elasticity can include thinner fibers than the region of lower elasticity. The region of higher elasticity can have a different pattern than the region of lower elasticity.

Another aspect of the invention provides an articulating device including: an inflatable elastic layer and a textile shell surrounding or impregnated within at least a portion of the inflatable elastic layer. The textile shell has a curved profile. The textile shell selectively constrains expansion of the inflatable elastic layer to produce controlled bending.

This aspect of the invention can have a variety of embodiments. The inflatable elastic layer can be an elastomeric bladder. The elastomeric bladder can be received within the textile shell.

The inflatable elastic layer can be bonded to an inner surface of the textile shell.

Another aspect of the invention provides a method including: applying fluid pressure within the inflatable elastic layer of the articulating device as described herein.

This aspect of the invention can have a variety of embodiments. The method can further include releasing the fluid pressure. Fluid pressure can be applied to a plurality of articulating devices in order to grasp an object.

BRIEF DESCRIPTION OF THE DRAWINGS

For a fuller understanding of the nature and desired objects of the present invention, reference is made to the following detailed description taken in conjunction with the figures wherein.

DEFINITIONS

The instant invention is most clearly understood with reference to the following definitions.

As used in the specification and claims, the singular form "a," "an," and "the" include plural references unless the context clearly dictates otherwise.

Unless specifically stated or obvious from context, as used herein, the term "about" is understood as within a range of normal tolerance in the art, for example within 2 standard deviations of the mean. About can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein are modified by the term about.

As used in the specification and claims, the terms "comprises," "comprising," "containing," "having," and the like can have the meaning ascribed to them in U.S. patent law and can mean "includes," "including," and the like.

Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 (as well as fractions thereof unless the context clearly dictates otherwise).

Unless specifically stated or obvious from context, as used herein, the term "or" is understood to be inclusive.

DESCRIPTION OF THE INVENTION

Figure 1A:
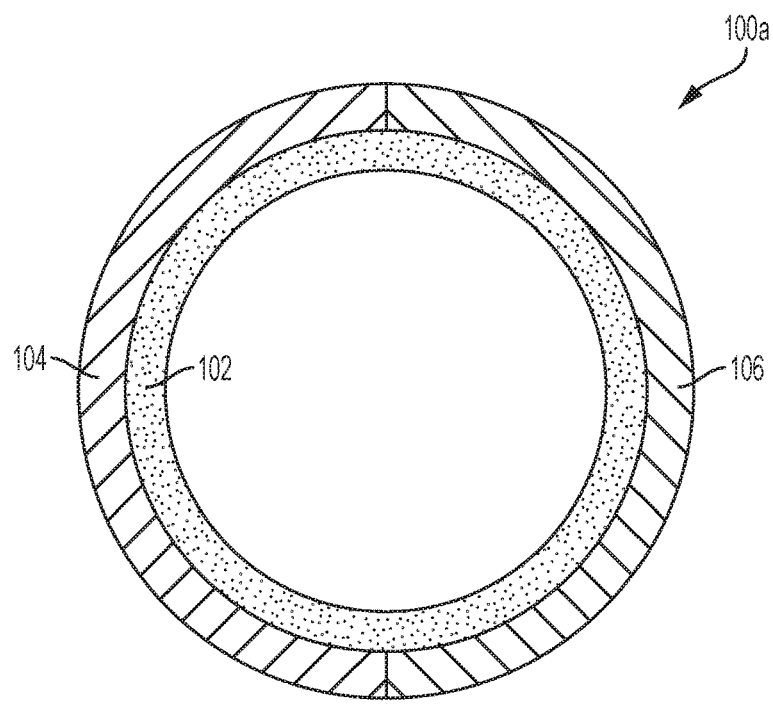
FIGS. 1A and 1B depict longitudinal cross-sectional views of articulating devices in accordance with embodiments of the invention.

Referring now to FIG. 1A, a longitudinal cross-sectional view of an articulating device 100*a* is provided. Articulating device 100*a* includes an inflatable elastic layer 102 and a textile shell having at least two regions 104, 106 of different material properties or knit patterns. The textile shell selectively and/or differentially constrains expansion of the inflatable elastic layer 102 to produce controlled bending or torsion as will be discussed further herein.

Inflatable elastic layer 102 can be formed of any material capable of resilient expansion when an internal fluid pressure is applied. For example, inflatable elastic layer 102 can be formed from an elastomer such as rubber, acrylonitrile-butadiene rubber, hydrogenated acrylonitrile-butadiene rubber, fluorocarbon rubber, perfluoroelastomer, ethylene propylene diene rubber, silicone rubber, fluorosilicone rubber, chloroprene rubber, neoprene rubber, polyester urethane, polyether urethane, natural rubber, latex, polyacrylate rubber, ethylene acrylic, styrene-butadiene rubber, ethylene oxide epichlorodrine rubber, chlorosulfonated polyethylene, butadiene rubber, isoprene rubber, butyl rubber, and the like.

Inflatable elastic layer 102 can be preformed and then inserted into or wrapped with a textile shell. Alternatively, the inflatable elastic layer can be applied to an inner surface of the textile shell by spray coating, rolling, or application with a puck as described in U.S. Patent Application Publication No. 2010/0183893.

Figure 1B:
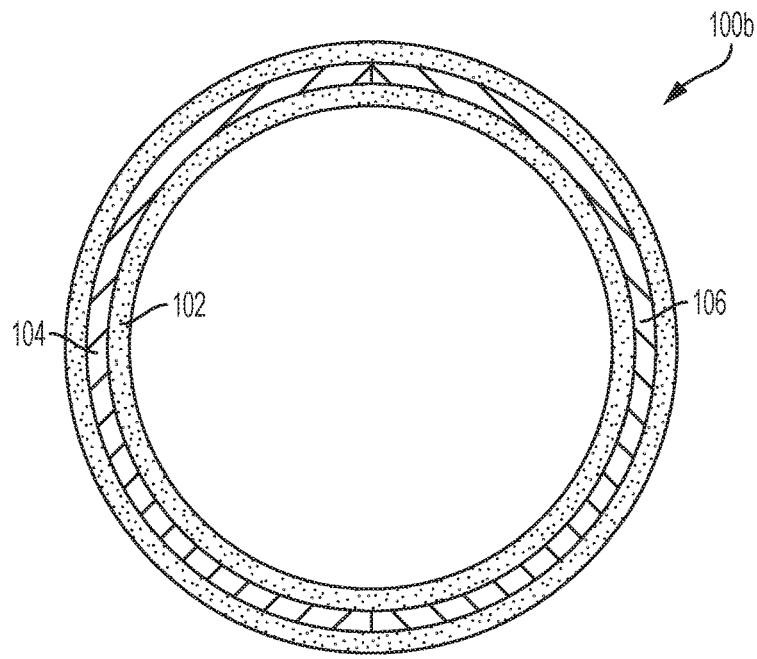

Referring now to FIG. 1B, inflatable elastic layer 102 can completely envelop the textile shell. For example, the textile shell can be dipped in liquid elastomer or the elastomer can be applied to both the inner and outer surfaces of textile shell.

The textile shell can be fabricated from a variety of materials. For example, textiles can be made from a variety of natural and synthetic fibers such as natural fibers, cotton, wool, silk, hemp, flax, animal hair, jute, modal, cellulose, bamboo, piña, ramie, nettles, milkweed, seaweed, metals, metal cables, manufactured fibers, monofilament, azlon, acetate, triacetate, viscose, lyocell, glass, graphite carbon, carbon fiber, carbon nanotube, liquid crystal, ceramics, polyesters, aramids, para-aramids, meta-aramids, aromatic polyesters, rayon, acrylics, modacrylics, polyacrylonitrile, polylactides (PLAs), polyamides, polyamide 6, polyamide 6.6, rubber lastrile, lastol, polyethylene (PE), high-density polyethylene (HDPE), polyethylene terephthalate (PET), polypropylene (PP), polytetrafluoroethylene (PTFE), vinyl, vinyon, vinylidene chloride, polyvinylidene chloride (PVDC), polybenzimidazole (PBI), novoloid, melamine, anidex, nytril, elastoester, nylon, spandex/elastane, olefins, biosynthetic polymers, and blends of the same. Suitable aramids, para-aramids, and meta-aramids are sold under the KEVLAR® and NOMEX® brands by E. I. du Pont de Nemours and Company of Wilmington, Del., under the TECHNORA® brand by Teijin Limited of Osaka, Japan, and under the TWARON® brand by Teijin Aramid B.V. of Arnhem, The Netherlands. Suitable aromatic polyesters are available under the VECTRAN® and VECTRAN® EX brands from Kuraray America, Inc. of Fort Mill, S.C.

Differences in compliance between regions 104 and 106 can be achieved using a variety of techniques. For example, one region can be made from textiles having thinner fibers than the other region. In another example, one region can have a denser and/or tighter weave, knit, or the like. In another example, a knit geometry can be created with a single yarn.

In yet another example, one region can be treated by applying energy to fuse, melt, cross-link, or otherwise increase the rigidity of the textile (especially synthetic textiles) to decrease its compliance. For example, the textile shell can be placed over a mold including energy-supplying regions corresponding to the desired locations of less compliant regions. For example, energy-supplying regions can include a plurality of vents adapted and configured to release hot air or steam into the desired less compliant regions.

Textiles for regions 104, 106 can be formed using a variety of manual or automated means. For example, textiles can be formed using an industrial flatbed knitting machine. Knitting is the intermeshing of yarns into loops resulting in fabrics. In particular, knitting is the process of creating fabric with yarns by forming a series of interconnected loops. Three-dimensional knitted shapes can be made using various loop configuration (knit stitches) such as knit and purl, tuck, miss and the like and/or various shaping techniques such as flechage, bindoff, tubular half gauge and the like. All techniques can be used individually or in combinations with one another within the same structure.

Textiles for regions 104, 106 can have varying compliance or stiffness. For example, either of the textiles can have a Young's modulus of between about 0.01 GPa and about 0.1 GPa, between about 0.1 GPa and about 1 GPa, between about 1 GPa and about 5 GPa, between about 5 GPa and about 10 GPa, between about 10 GPa and about 50 GPa, between about 50 GPa and about 100 GPa, between about 100 GPa and about 150 GPa, between about 150 GPa and about 200 GPa, and the like.

Figure 2A:
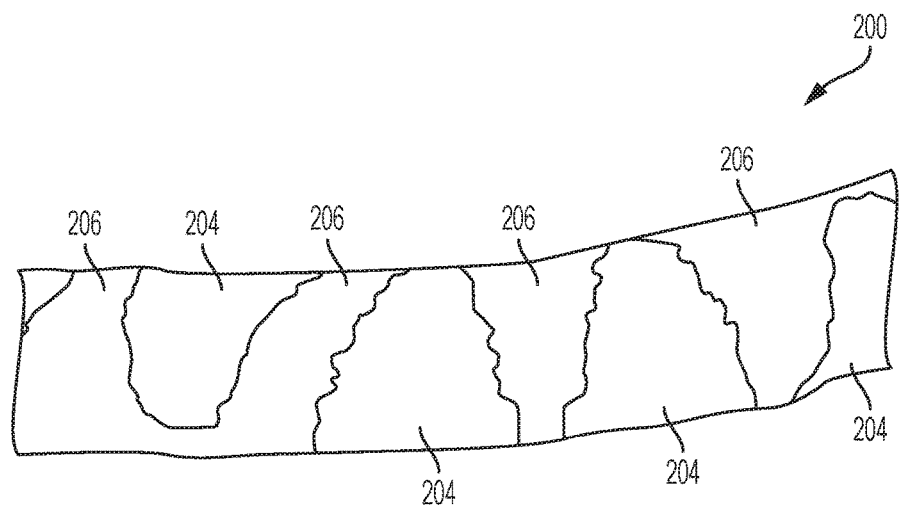
FIGS. 2A and 2B depict articulating devices in uninflated states in accordance with embodiments of the invention.
Figure 2B:
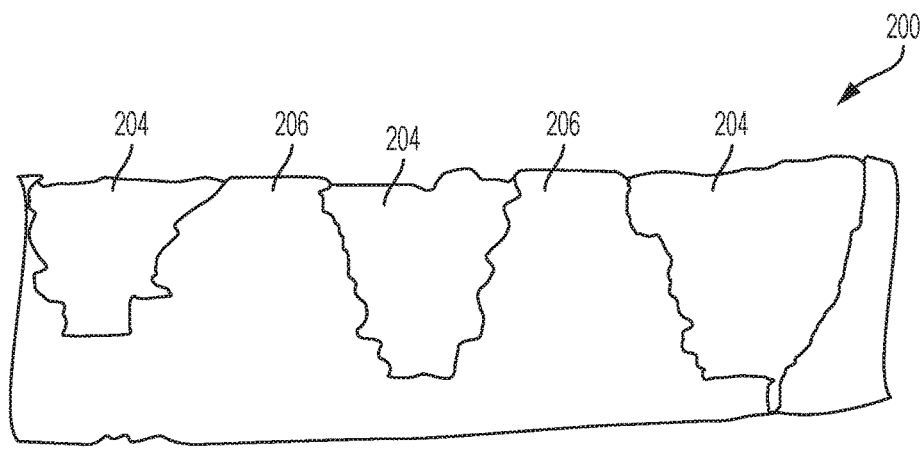

Referring now to FIGS. 2A and 2B, two views of an articulating device 200 in an uninflated state are provided. Regions 204 and 206 are fabricated from different color yarns. In some embodiments, the regions 204 having greater compliance can have profile (e.g., a triangular or sector-shaped profile) adapted and configured to produce a desired articulation when the articulating device 200 is inflated.

Figure 2C:
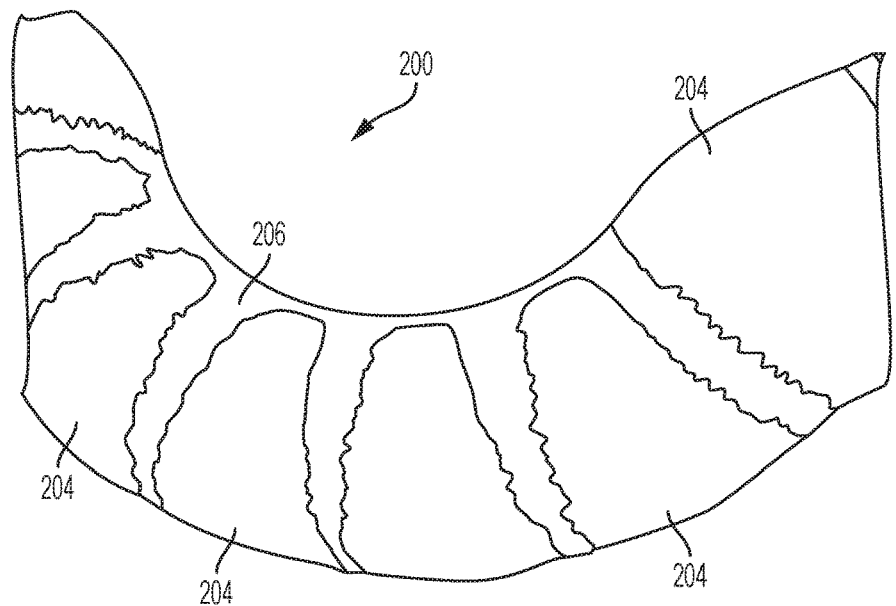
FIGS. 2C and 2D depict articulating devices in inflated states in accordance with embodiments of the invention.
Figure 2D:
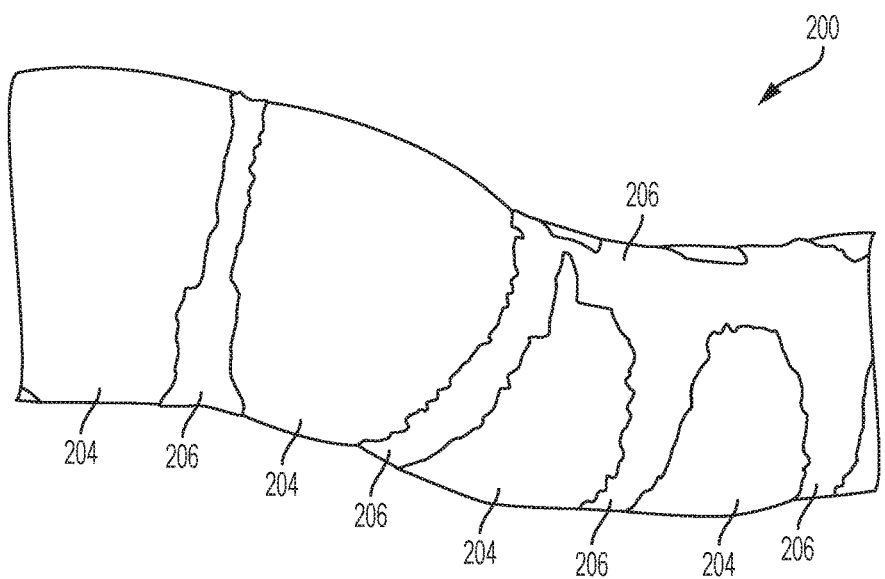

As can be best seen in FIGS. 2C and 2D, when articulating device 200 is inflated, the regions 204 composed of blue yarn have a greater compliance than the regions 206 composed of yellow yarn and deform to a greater extent. As a result, articulating device elongates more on one side relative to opposite side and articulates, bends, or curves in a desired direction.

A grasping device including a plurality of articulating devices can be fabricated in order to grasp, hold, and/or lift a device. For example, three or more arms can be provided in a similar architecture to that depicted in International Publication Nos. WO 2012/148472, WO 2013/103412, and WO 2013/148340. In such an arrangement, the articulating devices would be arranged in a radial pattern with the regions of each device having less compliance positioned on the grasping side of the device. When the articulating devices are inflated, each articulating device would bend in the same direction to engage a device to be lifted.

Figure 3A:
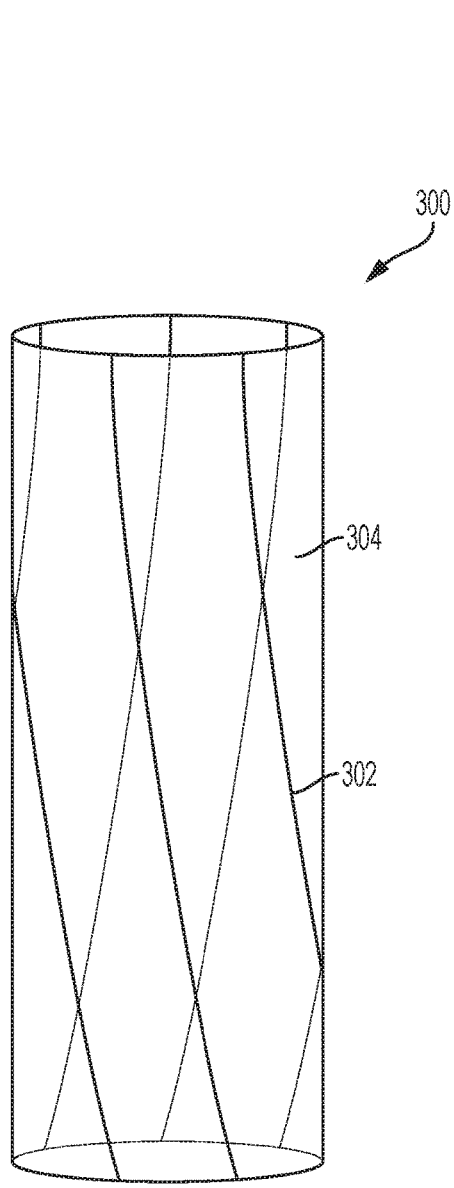
FIGS. 3A and 3B depict articulating devices for producing torsion in accordance with embodiments of the invention.
Figure 3B:
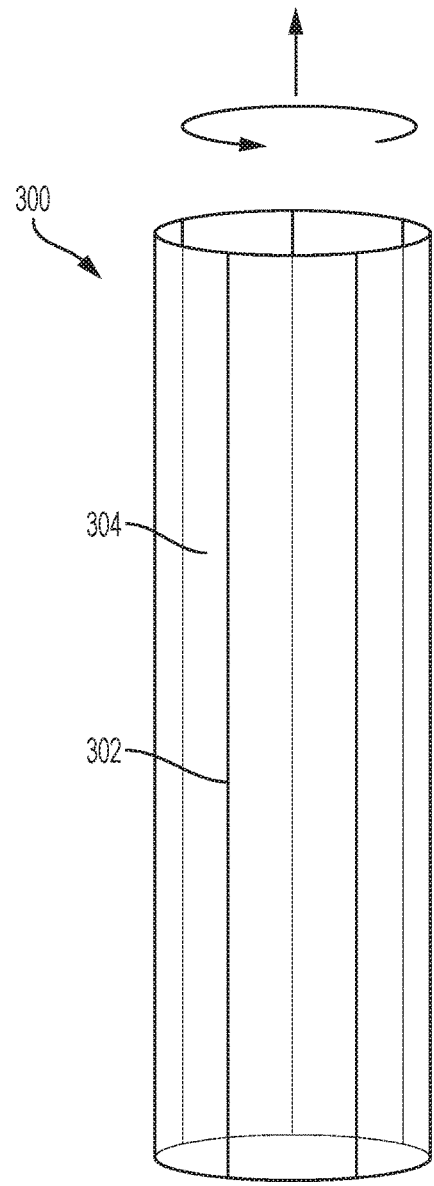

In another embodiment, the articulating device can twist to produce torsion. Referring now to FIGS. 3A and 3B, the textile shell can include helically wound strips of material 302 having a lower compliance than the textile in adjacent textiles 304. When the device 300 is inflated, material 302 will seek to straighten and, as a result, produce torsion.

Figure 4:
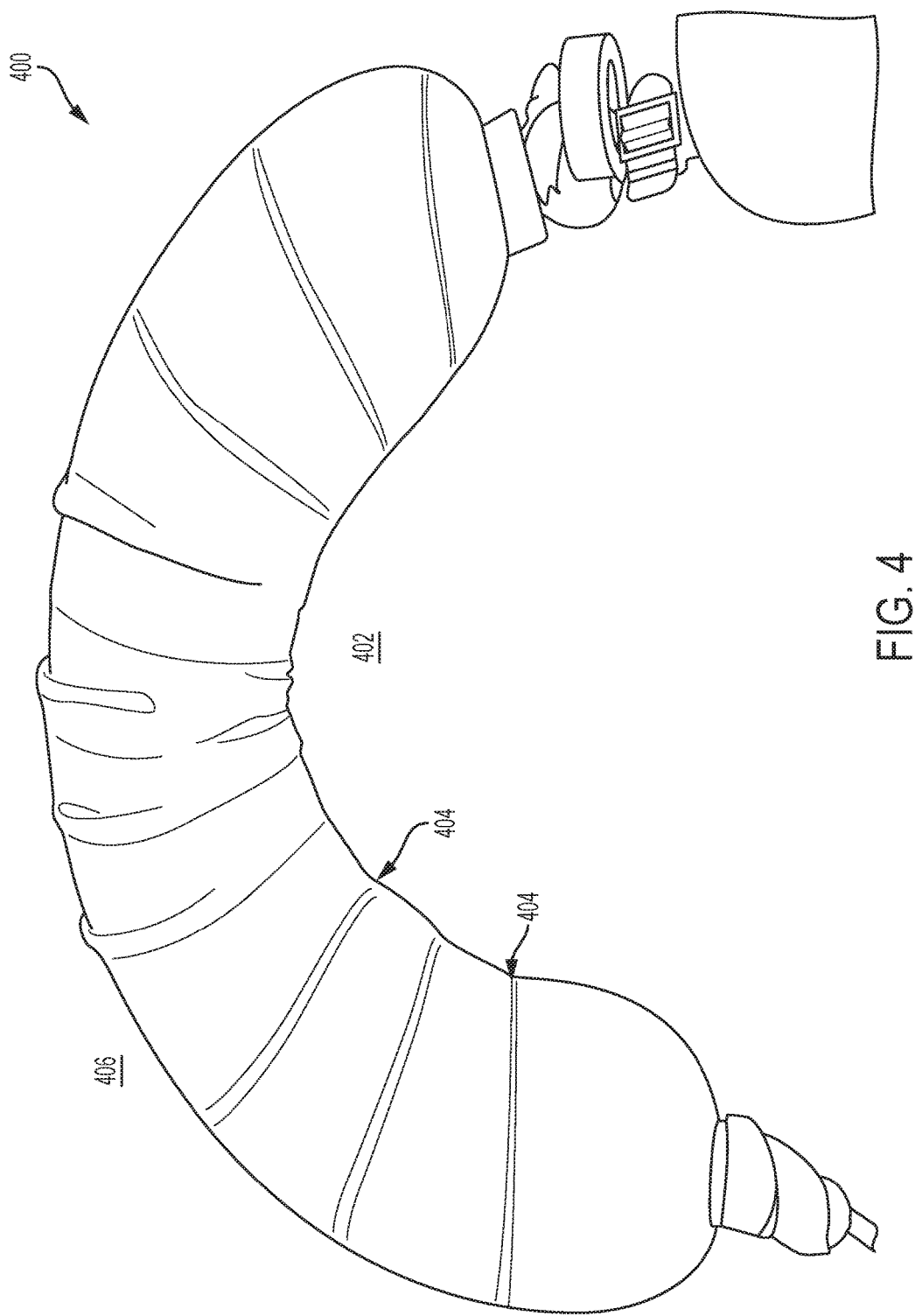
FIG. 4 depicts an articulating device formed from a single yarn in accordance with embodiments of the invention.
Figure 5:
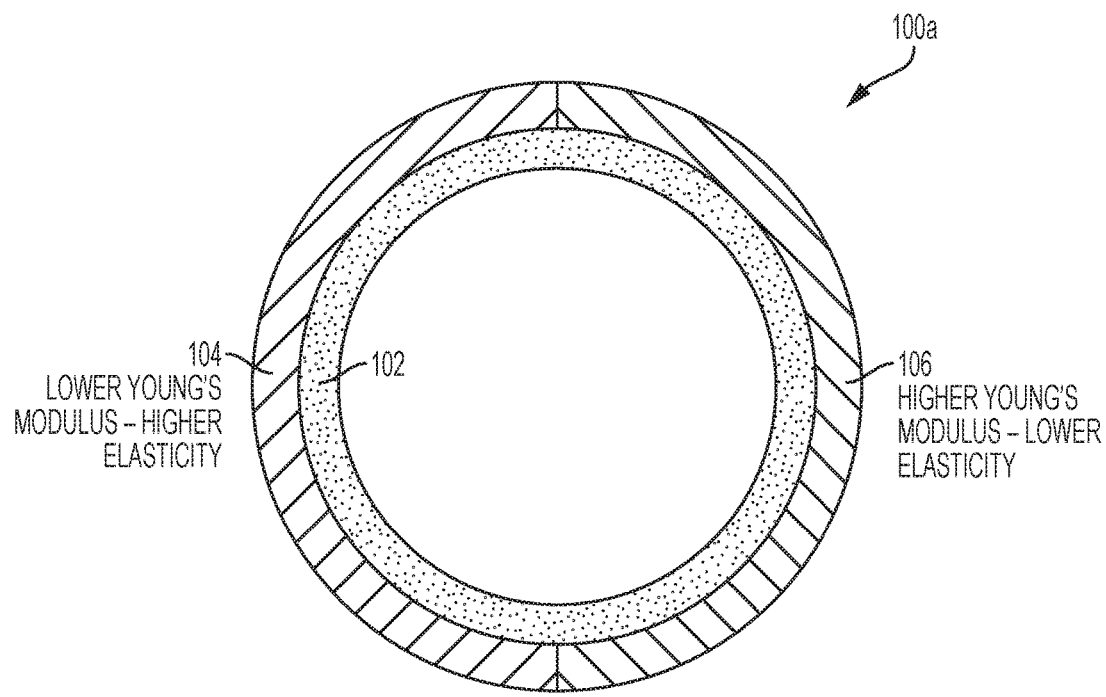
FIG. 5 depicts a longitudinal cross-sectional view of an articulating device having regions with lower Young's modulus (higher elasticity) and regions with higher Young's modulus (lower elasticity) in accordance with embodiments of the invention.
Figure 6:
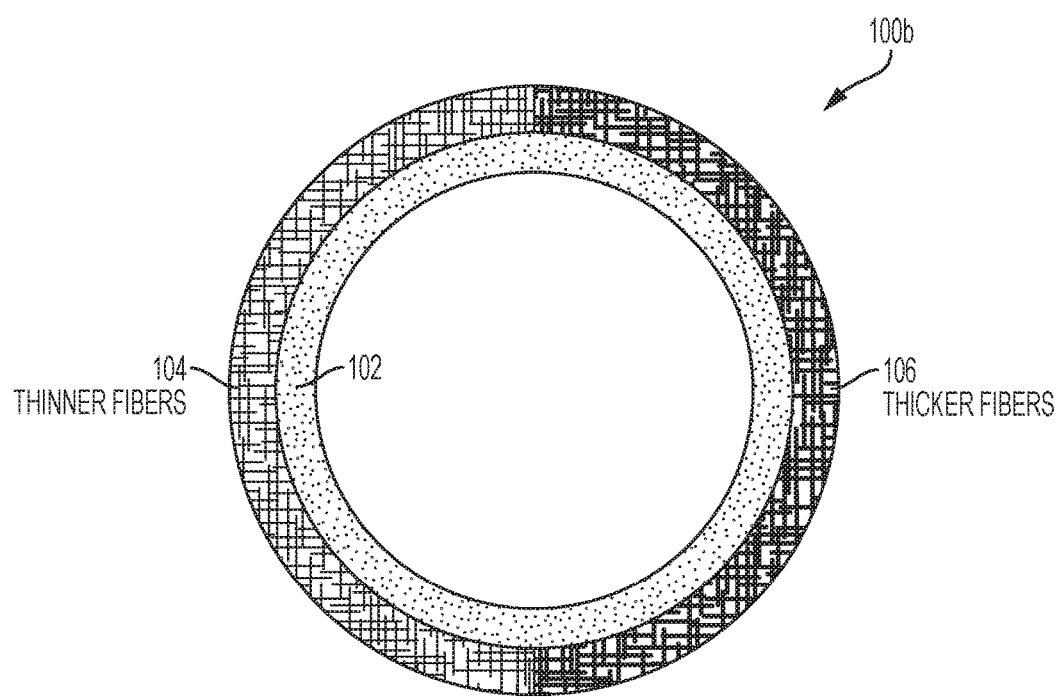
FIG. 6 depicts a longitudinal cross-sectional view of an articulating device having regions with thinner fibers and regions with thicker fibers in accordance with embodiments of the invention.

Referring now to FIG. 4, another embodiment of the invention provides an articulating device 400 utilizing a uniform textile shell. By varying the length of the textile shell on an inner side 402 (e.g., through flechage 404), a preexisting curve can be produced that is enhanced when the articulating device 400 is inflated. Outer side 406 has a longer length of material and, therefore, greater stretchability.

The articulating devices described herein can be used in a variety of robotics applications including industrial, defense, law enforcement, wearable robotics, and the like. For example, a tool, an effector, or other attachment can be positioned on one end of the articulating device for movement from a starting position to a desired position and then retraction to an initial position.

In one embodiment, the articulating devices described herein can be incorporated into an exoskeleton or garment and utilized to mimic the functionality of missing finger. In another embodiment, the articulating devices can be incorporated into an exoskeleton or garment and positioned along one or limbs such as fingers, arms, and legs can facilitate and/or support movement of those limbs. For example, one or more articulating devices can be positioned along the dorsal, ventral, medial, and/or lateral sides of a leg and can be controlled to cause or assist extension and/or flexion and/or to hold the leg in a desired position (e.g., when lifting or holding a heavy object). In some embodiments, opposing pairs of articulating devices can be used in which one articulating device facilitates extension while the opposing articulating device facilitates flexion. The opposing pairs can be positioned on the same or opposite surfaces of the limb.

EQUIVALENTS

Those skilled in the art will recognize, or be able to ascertain using no more than routine experimentation, many equivalents of the specific embodiments of the invention described herein. Such equivalents are intended to be encompassed by the following claims.

INCORPORATION BY REFERENCE

The entire contents of all patents, published patent applications, and other references cited herein are hereby expressly incorporated herein in their entireties by reference.

The invention claimed is:

1. An articulating device comprising:
   an inflatable elastic layer; and
   a textile shell surrounding or impregnated within at least a portion of the inflatable elastic layer, the textile shell including at least two regions having different material properties or knit patterns, wherein the at least two regions include:
      a region of relatively lower elasticity; and
      a region of relatively higher elasticity;
      wherein the region of higher elasticity includes thinner fibers than the region of lower elasticity;
   wherein the textile shell selectively constrains expansion of the inflatable elastic layer to produce controlled bending or torsion.

2. The articulating device of claim 1, wherein the inflatable elastic layer is an elastomeric bladder.

3. The articulating device of claim 2, wherein the elastomeric bladder is received within the textile shell.

4. The articulating device of claim 1, wherein the inflatable elastic layer is bonded to an inner surface of the textile shell.

5. The articulating device of claim 1, wherein the region of relatively higher elasticity is positioned on an opposite side of the articulating device from the region of relatively lower elasticity.

6. The articulating device of claim 1, wherein the region of higher elasticity has a different pattern than the region of lower elasticity.

7. A method comprising:
   applying fluid pressure within the inflatable elastic layer of the articulating device according to claim 1.

8. The method of claim 7, further comprising:
   releasing the fluid pressure.

9. The method of claim 7, wherein fluid pressure is applied to a plurality of articulating devices in order to grasp an object.

10. An articulating device comprising:
    an inflatable elastic layer; and
    a textile shell surrounding or impregnated within at least a portion of the inflatable elastic layer, the textile shell including at least two regions having different material properties or knit patterns, wherein the at least two regions include:
       a region of relatively lower elasticity; and
       a region of relatively higher elasticity;
       wherein the region of higher elasticity includes a material having a lower Young's modulus than a material in the region of lower elasticity;
    wherein the textile shell selectively constrains expansion of the inflatable elastic layer to produce controlled bending or torsion.

11. The articulating device of claim 10, wherein the inflatable elastic layer is an elastomeric bladder.

12. The articulating device of claim 11, wherein the elastomeric bladder is received within the textile shell.

13. The articulating device of claim 10, wherein the inflatable elastic layer is bonded to an inner surface of the textile shell.

14. The articulating device of claim 10, wherein the region of relatively higher elasticity is positioned on an opposite side of the articulating device from the region of relatively lower elasticity.

15. The articulating device of claim 10, wherein the region of higher elasticity has a different pattern than the region of lower elasticity.

* * * * *